US010009602B2

(12) United States Patent
Kimura et al.

(10) Patent No.: US 10,009,602 B2
(45) Date of Patent: Jun. 26, 2018

(54) HEAD-MOUNTED DISPLAY DEVICE AND CONTROL METHOD FOR THE HEAD-MOUNTED DISPLAY DEVICE

(71) Applicant: SEIKO EPSON CORPORATION, Tokyo (JP)

(72) Inventors: Fusashi Kimura, Matsumoto (JP); Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 77 days.

(21) Appl. No.: 14/819,111

(22) Filed: Aug. 5, 2015

(65) Prior Publication Data
US 2015/0341624 A1 Nov. 26, 2015

Related U.S. Application Data

(63) Continuation of application No. 13/351,492, filed on Jan. 17, 2012, now Pat. No. 9,128,282.

(30) Foreign Application Priority Data

Feb. 10, 2011 (JP) .................................. 2011-026809
Feb. 10, 2011 (JP) .................................. 2011-026810

(51) Int. Cl.
*G09G 5/10* (2006.01)
*H04N 13/04* (2006.01)
(Continued)

(52) U.S. Cl.
CPC ............. *H04N 13/044* (2013.01); *G02B 6/00* (2013.01); *G02B 27/017* (2013.01);
(Continued)

(58) Field of Classification Search
CPC ...... H04N 13/044; G09G 3/36; G09G 3/3233; G09G 2320/041; G09G 2330/021;
(Continued)

(56) References Cited

U.S. PATENT DOCUMENTS 5,959,365 A  *  9/1999  Mantini .............. B60C 23/0408
                                                       180/197
6,445,363 B1 *  9/2002  Urisaka ................ G02B 27/017
                                                       345/7
(Continued)

FOREIGN PATENT DOCUMENTS

JP    H09-130704 A    5/1997
JP    2009-118159 A   5/2009

OTHER PUBLICATIONS

Dec. 30, 2013 Office Action issued in U.S. Appl. No. 13/351,492.
(Continued)

*Primary Examiner* — Patrick Edouard
*Assistant Examiner* — Joseph Fox
(74) *Attorney, Agent, or Firm* — Oliff PLC

(57) ABSTRACT

A head-mounted display device includes: an image-light generating unit for right eye that generates image light from image data for right eye and emits the image light; an image-light generating unit for left eye that generates image light from image data for left eye and the image light; a light guide units that guide the emitted image lights to the left and right eyes of the user; and a display control unit that transmits control signals for controlling the emission of the image lights respectively to the image-light generating unit for right eye and the image-light generating unit for left eye. The display control unit transitions, according to a condition set in advance, the head-mounted display device to a power saving state for causing one of the image-light generating unit for right eye and the image-light generating unit for left eye to stop the emission of the image light.

16 Claims, 15 Drawing Sheets

(51) Int. Cl.
 *G09G 3/36* (2006.01)
 *G09G 3/3233* (2016.01)
 *G02B 6/00* (2006.01)
 *G02B 27/01* (2006.01)

(52) U.S. Cl.
 CPC .............. *G09G 3/3233* (2013.01); *G09G 3/36* (2013.01); *G02B 2027/014* (2013.01); *G02B 2027/0118* (2013.01); *G02B 2027/0143* (2013.01); *G02B 2027/0147* (2013.01); *G02B 2027/0178* (2013.01); *G09G 2320/041* (2013.01); *G09G 2330/021* (2013.01)

(58) Field of Classification Search
 CPC .. G02B 6/00; G02B 27/017; G02B 2027/014; G02B 2027/0143; G02B 2027/0147; G02B 2027/0118; G02B 2027/0178
 See application file for complete search history.

(56) References Cited

U.S. PATENT DOCUMENTS

| | | |
|---|---|---|
| 6,512,497 B1 | 1/2003 | Kondo et al. |
| 2001/0005185 A1 | 6/2001 | Endo et al. |
| 2005/0088365 A1 | 4/2005 | Yamazaki et al. |
| 2005/0191028 A1 | 9/2005 | Matsuda et al. |
| 2008/0088554 A1 | 4/2008 | Lee |
| 2009/0109246 A1 | 4/2009 | Oh |
| 2010/0045190 A1* | 2/2010 | Cramer .............. H05B 33/0854 315/151 |
| 2010/0053133 A1 | 3/2010 | Furuta |
| 2010/0060551 A1 | 3/2010 | Sugiyama et al. |
| 2010/0103078 A1 | 4/2010 | Mukawa et al. |
| 2010/0148702 A1 | 6/2010 | Shen |
| 2010/0214275 A1 | 8/2010 | Chiou |
| 2010/0259603 A1* | 10/2010 | Mihara .............. H04N 13/0438 348/53 |
| 2010/0302219 A1 | 12/2010 | Kitashou |
| 2010/0328331 A1 | 12/2010 | Iwaki et al. |
| 2011/0006690 A1 | 1/2011 | Hoffman et al. |
| 2011/0128209 A1 | 6/2011 | Ono |
| 2011/0138208 A1 | 6/2011 | Lee et al. |
| 2011/0298826 A1 | 12/2011 | Namba |
| 2012/0200478 A1 | 8/2012 | Kobayashi |
| 2012/0242560 A1 | 9/2012 | Nakada et al. |
| 2012/0242570 A1 | 9/2012 | Kobayashi |
| 2012/0242677 A1 | 9/2012 | Kobayashi |

OTHER PUBLICATIONS

May 21, 2014 Office Action issued in U.S. Appl. No. 13/351,492.
Oct. 2, 2014 Office Action issued in U.S. Appl. No. 13/351,492.
May 1, 2015 Notice of Allowance issued in U.S. Appl. No. 13/351,492.

* cited by examiner

TIME t1

TIME t2

TIME t3

TIME t1

TIME t2

TIME t1

TIME t2

TIME t3

HEAD-MOUNTED DISPLAY DEVICE AND CONTROL METHOD FOR THE HEAD-MOUNTED DISPLAY DEVICE

This is a continuation application of application Ser. No. 13/351,492 filed Jan. 17, 2012 which claims priority to JP2011-026810 filed Feb. 10, 2011 and JP2011-026809 filed Feb. 10, 2011. The disclosures of the prior application are hereby incorporated by reference herein in their entirety.

BACKGROUND

1. Technical Field

The present invention relates to a head-mounted display device, which is a display device mounted on the head, and a control method for the head-mounted display device.

2. Related Art

There is known a head-mounted display device (a head mounted display, HMD), which is a display device mounted on the head. For example, the head-mounted display device generates image light representing an image using a liquid crystal display and a light source and guides the generated image light to the eyes of a user using a projection optical system and a light guide plate to thereby cause the user to recognize a virtual image. In general, in the head mounted display, a configuration capable of being battery-driven is adopted in order to improve portability. The battery-driven head mounted display is requested to reduce power consumption of the head mounted display in order to increase an available time. In this regard, in the past, there is known a technique for realizing a reduction in power consumption of the head mounted display by reducing the resolution or the frame rate of an image formed on a display device (see, for example, JP-A-2009-118159). However, when the resolution or the frame rate of the image formed on the display device is reduced, the image quality of a virtual image recognized by the user is markedly deteriorated.

SUMMARY

An advantage of some aspects of the invention is to provide a technique for realizing low power consumption without deteriorating the image quality of a virtual image recognized by a user.

Application Example 1

This application example of the invention is directed to a head-mounted display device that causes a user to recognize a virtual image in a state in which the head-mounted display device is mounted on the head of the user. The head-mounted display device includes: an image-light generating unit for right eye that generates image light from image data for right eye corresponding to the right eye of the user and emits the image light; an image-light generating unit for left eye that generates image light from image data for left eye corresponding to the left eye of the user and emits the image light; a pair of light guide units that guide the image lights, which are emitted from the image-light generating unit for right eye and the image-light generating unit for left eye, to the left and right eyes of the user; and a display control unit that transmits control signals for controlling the emission of the image lights respectively to the image-light generating unit for right eye and the image-light generating unit for left eye. The display control unit transitions, according to a condition set in advance, the head-mounted display device to a power saving state for causing one of the image-light generating unit for right eye and the image-light generating unit for left eye to stop the emission of the image light and causing the other to execute the emission of the image light.

With such a configuration, the display control unit transitions, according to the condition set in advance, the head-mounted display device to the power saving state for causing one of the image-light generating unit for right eye and the image-light generating unit for left eye to stop the emission of the image light and causing the other to execute the emission of the image light. Therefore, in the head-mounted display device, it is possible to realize a reduction in power consumption without deteriorating the image quality of a virtual image recognized by the user.

Application Example 2

This application example of the invention is directed to the head-mounted display device of Application Example 1, wherein the condition set in advance is a condition that a target image used for display of the virtual image is a still image. With such a configuration, in the head-mounted display device, it is possible to realize a reduction in power consumption when the target image is a still image.

Application Example 3

This application example of the invention is directed to the head-mounted display device of Application Example 1 or 2, which further includes a battery that supplies electric power to the head-mounted display device. The condition set in advance is a condition that the remaining power of the battery is equal to or smaller than predetermined remaining power. With such a configuration, in the head-mounted display device, it is possible to realize a reduction in power consumption when the remaining power of the battery is equal to or smaller than the predetermined remaining power.

Application Example 4

This application example of the invention is directed to the head-mounted display device of any of Application Examples 1 to 3, which further includes an illuminance acquiring unit that acquires illuminance indicating ambient brightness. The condition set in advance is a condition that the acquired illuminance is equal to or lower than predetermined illuminance.

With such a configuration, in the head-mounted display device, it is possible to realize a reduction in power consumption when illuminance is equal to or lower than the predetermined illuminance.

Application Example 5

This application example of the invention is directed to the head-mounted display device of any of Application Examples 1 to 4, which further includes: a temperature detecting unit for right eye that detects the temperature of the image-light generating unit for right eye; and a temperature detecting unit for left eye that detects the temperature of the image-light generating unit for left eye. The condition set in advance is a condition that at least one of the temperature detected by the temperature detecting unit for right eye and the temperature detected by the temperature detecting unit for left eye is equal to or higher than predetermined temperature. With such a configuration, in the head-mounted display device, it is possible to realize a reduction in power consumption when at least one of the temperature of the image-light generating unit for right eye and the temperature of the image-light generating unit for left eye is equal to or higher than the predetermined temperature.

Application Example 6

This application example of the invention is directed to the head-mounted display device of any of Application Examples 1 to 5, wherein the condition set in advance is any one of a condition that the head-mounted display device detects startup of an application designated in advance in an operating system installed in the head-mounted display device, a condition that the head-mounted display device acquires a request from the outside, and a condition that the head-mounted display device detects that a state in which operation for the head-mounted display device is not detected continues for a predetermined time.

With such a configuration, in the head-mounted display device, it is possible to realize a reduction in power consumption when the head-mounted display device detects the startup of the application designated in advance in the operating system installed in the head-mounted display device, when the head-mounted display device acquires a request from the outside, or when the head-mounted display device detects that the state in which operation for the head-mounted display device is not detected continues for the predetermined time.

Application Example 7

This application example of the invention is directed to the head-mounted display device of any of Application Examples 1 to 6, which further includes a selection receiving unit that receives, from the user, selection of one of the image-light generating unit for right eye and the image-light generating unit for left eye, the emission of the image light from which is stopped by the display control unit.

With such a configuration, the head-mounted display device includes the selection receiving unit that receives, from the user, selection of one of the image-light generating unit for right eye and the image-light generating unit for left eye, the generation and the emission of the image light from which are stopped by the display control unit. Therefore, it is possible to improve convenience.

Application Example 8

This application example of the invention is directed to the head-mounted display device of any of Application Examples 1 to 7, wherein the display control unit alternately switches, in the power saving state, a first state for causing one of the image-light generating unit for right eye and the image-light generating unit for left eye to stop the emission of the image light and causing the other to execute the emission of the image light and a second state for causing one of the image-light generating unit for right eye and the image-light generating unit for left eye to execute the emission of the image light and causing the other to stop the emission of the image light.

With such a configuration, the display control unit alternately switches, in the power saving state, the first state for causing one of the image-light generating unit for right eye and the image-light generating unit for left eye to stop the emission of the image light and causing the other to execute the emission of the image light and the second state for causing one of the image-light generating unit for right eye and the image-light generating unit for left eye to execute the emission of the image light and causing the other to stop the emission of the image light. Therefore, in the head-mounted display device, it is possible to realize a reduction in power consumption without deteriorating the image quality of a virtual image recognized by the user.

Application Example 9

This application example of the invention is directed to the head-mounted display device of Application Example 8, wherein, in switching the first state and the second state, the display control unit switches the first state and the second state through a third state for causing both the image-light generating unit for right eye and the image-light generating unit for left eye to execute the emission of the image lights. With such a configuration, when the display control unit switches the first state and the second state, the display control unit switches the states through the third state for causing both the image-light generating unit for right eye and the image-light generating unit for left eye to execute the emission of the image lights. Therefore, it is possible to more naturally switch the first state and the second state.

Application Example 10

This application example of the invention is directed to the head-mounted display device of Application Example of 8 or 9, wherein the display control unit switches the first state and the second state further includes: a temperature detecting unit for right eye that detects the temperature of the image-light generating unit for right eye; and a temperature detecting unit for left eye that detects the temperature of the image-light generating unit for left eye. The display control unit switches the first state and the second state when a difference between the temperature detected by the temperature detecting unit for right eye and the temperature detected by the temperature detecting unit for left eye is equal to or larger than a predetermined temperature difference.

With such a configuration, the display control unit switches the first state and the second state when a difference between the temperature of the image-light generating unit for right eye and the temperature of the image-light generating unit for left eye is equal to or larger than a predetermined temperature difference. Therefore, it is possible to suppress a rise in the temperature of one of the image-light generating units.

Application Example 11

This application example of the invention is directed to the head-mounted display device of any of Application Examples of 1 to 10, which further includes an image processing unit that acquires a target image used for display of the virtual image and generates the image data for right eye and the image data for left eye using the target image.

The invention can be implemented in various forms. For example, the invention can be implemented in forms such as a head-mounted display device and a control method for the head-mounted display device, a head-mounted display system, a computer program for realizing functions of the method, device, or the system, and a recording medium having recorded therein the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below.

A. First Embodiment

A-1. Configuration of a Head-Mounted Display Device

Figure 1:
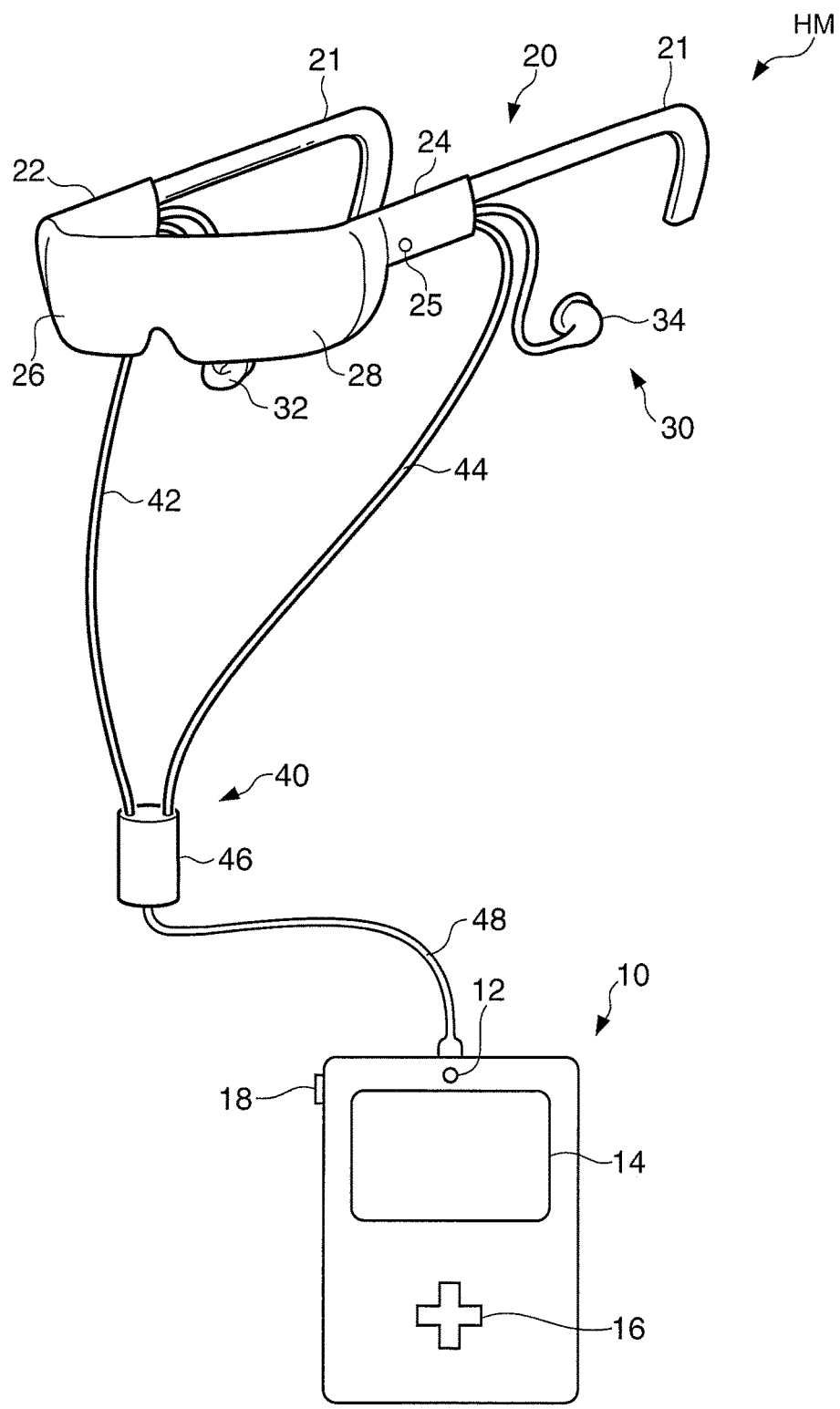
FIG. 1 is an explanatory diagram showing an external configuration of a head-mounted display device in a first embodiment of the invention.

FIG. 1 is an explanatory diagram showing an external configuration of a head-mounted display device in a first embodiment of the invention. A head-mounted display device HM is a display device mounted on the head and is also called head mounted display (HMD). The head mounted display HM in this embodiment is an optical transmissive head-mounted display device 30 with which a user can visually recognize a virtual image and at the same time directly visually recognize an external scene.

The head mounted display HM includes an image display unit 20 that causes the user to visually recognize a virtual image in a state in which the image display unit 20 is mounted on the head of the user and a controller 10 that controls the image display unit 20.

The image display unit 20 is a mounted member mounted on the head of the user. In this embodiment, the image display unit 20 has an eyeglass shape. The image display unit 20 includes ear hooking sections 21, a right display driving unit 22, a left display driving unit 24, an illuminance sensor 25, a right optical panel 26, and a left optical panel 28. The ear hooking sections 21 are members provided to transverse on the ears of the user from the ends of the right display driving unit 22 and the left display driving unit 24 and function as temples. The right optical panel 26 and the left optical panel 28 are arranged to be respectively located before the right and left eyes of the user in a state in which the user wears the image display unit 20. The right display driving unit 22 is arranged in a connecting place of the ear hooking section 21 for the right ear and the right optical panel 26. The left display driving unit 24 is arranged in a connecting place of the ear hooking section 21 for the left ear and the left optical panel 28. In the following explanation, the right display driving unit 22 and the left display driving unit 24 are collectively referred to simply as "display driving unit". The right optical panel 26 and the left optical panel 28 are collectively referred to simply as "optical panel". The illuminance sensor 25 functioning as the illuminance acquiring unit is a sensor for acquiring ambient brightness (illuminance).

The display driving unit includes an LCD (Liquid Crystal Display), a projection optical system, and the like, which are not shown in the figure. Details are explained later. The optical panel includes a light guide plate and a light modulating plate, which are not shown in the figure. The light guide plate is formed of a light transmissive resin material or the like and emits image light, which is captured from the display driving unit, to the eyes of the user. The light modulating plate is an optical device of a thin plate shape and is arranged to cover the front side (a side opposite to the side of the eyes of the user) of the light guide plate. The light modulating plate protects the light guide plate, suppresses, for example, damage and adhesion of stains to the light guide plate, and adjusts the light transmittance of the light modulating plate. Consequently, the light modulating plate can adjust an amount of external light entering the eyes of the user and adjust easiness of visual recognition of a virtual image. The light modulating plate can be omitted. The image display unit 20 further includes a right earphone 32 for the right ear and a left earphone 34 for the left ear. The right earphone 32 and the left earphone 34 are respectively worn on the right ear and the left ear when the user wears the image display unit 20.

The image display unit 20 further includes a connecting unit 40 for connecting the image display unit 20 to a controller 10. The connecting unit 40 includes a main body cord 48 connected to the controller 10, a right cord 42 and a left cord 44, which are two cords branching from the main body cord 48, and a coupling member 46 provided at a branch point. The right cord 42 is connected to the right display driving unit 22. The left cord 44 is connected to the left display driving unit 24. The image display unit 20 and the controller 10 perform transmission of various signals via the connecting unit 40. Connectors (not shown) that fit with each other are respectively provided at an end on the opposite side of the coupling member 46 in the main body cord 48 and the controller 10. The controller 10 and the image display unit 20 are connected and disconnected by fitting the connector of the main body cord 48 and the connector of the controller 10 and releasing the fitting. As the right cord 42, the left cord 44, and the main body cord 48, for example, a metal cable and an optical fiber can be adopted.

The controller 10 is a device for operating the head mounted display HM. The controller 10 includes a lighting unit 12, a touch pad 14, a cross key 16, and a power switch 18. The lighting unit 12 notifies an operation state of the head mounted display HM (e.g., an ON or OFF state of the power supply) with a light emission state of the lighting unit 12. As the lighting unit 12, for example, an LED (Light Emitting Diode) can be used. The touch pad 14 detects finger operation by the user on an operation surface of the touch pad 14 and outputs a signal corresponding to detection content. The cross key 16 detects pressing operation of keys corresponding to up, down, left, and right directions and outputs a signal corresponding to detection content. The power switch 18 detects slide operation of the switch to switch a power-on state of the head mounted display HM.

Figure 2:
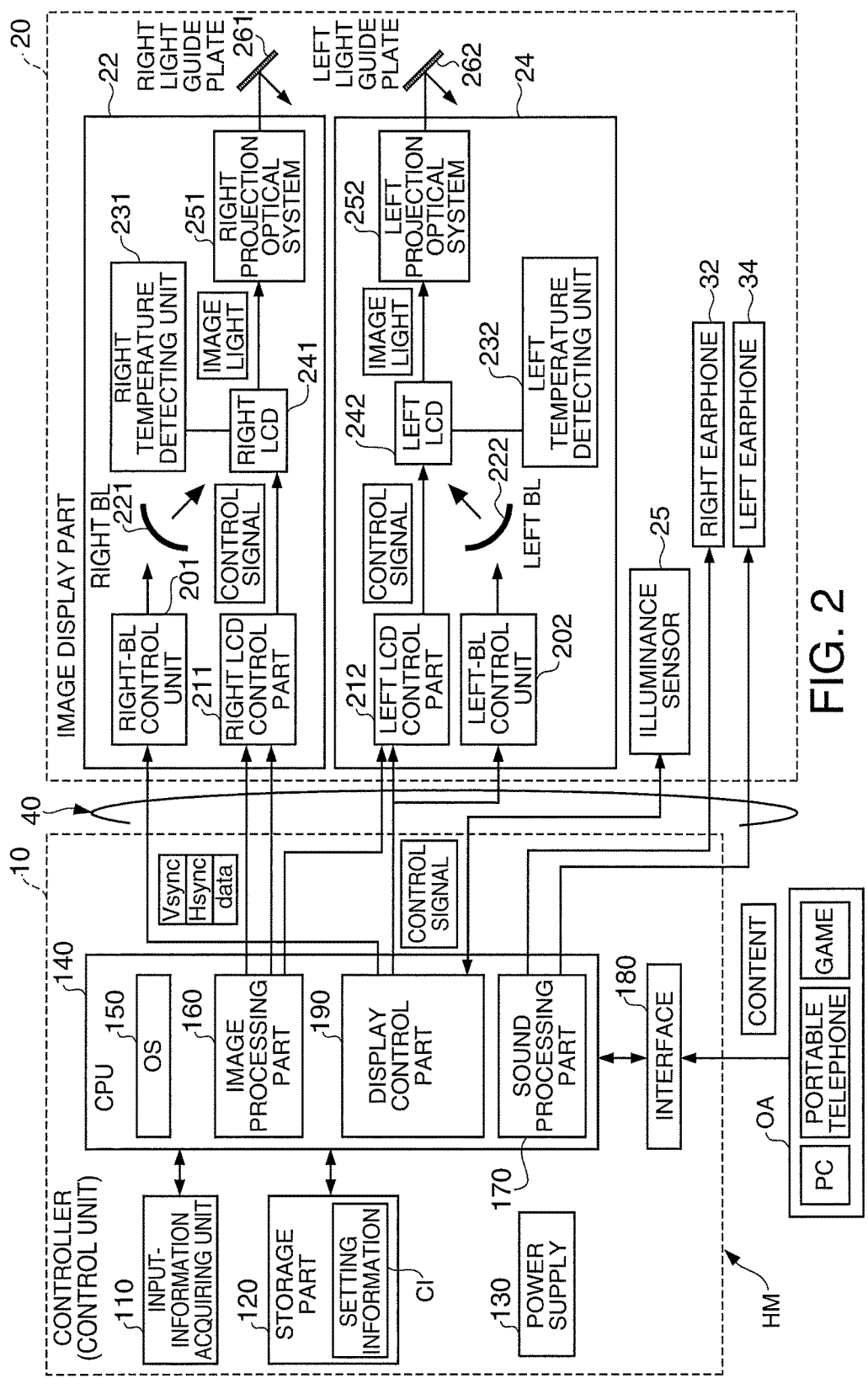
FIG. 2 is a block diagram functionally showing the configuration of a head mounted display.

FIG. 2 is a block diagram functionally showing the configuration of the head mounted display HM. The controller 10 includes an input-information acquiring unit 110, a storing unit 120, a power supply 130, a CPU 140, and an interface 180. These units are connected to one another by a not-shown bus. The input-information acquiring unit 110 includes a function of acquiring a signal corresponding to an operation input by the user (e.g., an operation input to a touch pad 14, the cross key 16, or the power switch 18). The storing unit 120 is a storing unit including a ROM, a RAM, a DRAM, and a hard disk, which are not shown in the figure. Setting information CI is stored in the storing unit 120 (details are explained later). The power supply 130 supplies electric power to the units of the head mounted display HM. As the power supply 130, for example, a secondary battery can be used.

The CPU 140 executes a computer program installed in advance to thereby provide a function of an operating system (OS) 150. The CPU 140 expands firmware or a computer program stored in the ROM or the hard disk on the RAM and executes the firmware or the computer program to thereby function as an image processing unit 160 (details are explained later), a sound processing unit 170 (details are explained later), and a display control unit 190 (details are explained later).

The interface 180 is an interface for connecting various external apparatuses OA (e.g., a personal computer PC, a cellular phone terminal, and a game terminal), which are supply sources of contents, to the controller 10. As the interface 180, the controller 10 can include, for example, a USB interface, a micro USB interface, an interface for memory card, or a wireless LAN interface. Contents mean information contents including an image (a still image or a moving image) and sound. The image processing unit 160 generates a vertical synchronization signal VSync, a horizontal synchronization signal HSync, and image data Data on the basis of contents input via the interface 180 and supplies these signals to the image display unit 20 via the connecting unit 40. Specifically, the image processing unit 160 acquires an image signal included in the contents. For example, in the case of a moving image, the acquired image signal is, in general, an analog signal including thirty frame images per second. The image processing unit 160 separates synchronization signals such as the vertical synchronization signal VSync and the horizontal synchronization signal HSync from the acquired image signal. The image processing unit 160 converts the analog image signal, from which the synchronization signals are separated, into a digital image signal using a not-shown A/D conversion circuit or the like. Thereafter, the image processing unit 160 stores, frame by frame, the digital image signal after the conversion in the DRAM in the storing unit 120 as image data Data (RGB data) of a target image. The image processing unit 160 outputs the image data Data of the target image as image data for right eye and image data for left eye. The image processing unit 160 may execute, on the image data, image processing such as resolution conversion processing, various kinds of color tone correction processing such as adjustment of luminance and chroma, and keystone correction processing according to necessity.

The display control unit 190 generates control signals for controlling the right display driving unit 22 and the left display driving unit 24 and supplies the control signals to the image display unit 20 via the connecting unit 40 to thereby control an image display state in the image display unit 20. Specifically, the display control unit 190 separately controls, according to the control signals, effectiveness/ineffectiveness of driving of a right LCD 241 by a right LCD-control unit 211, effectiveness/ineffectiveness of driving of a right backlight 221 by a right-backlight control unit 201, effectiveness/ineffectiveness of driving of a left LCD 242 by a left-LCD control unit 212, and effectiveness/ineffectiveness of driving of a left backlight 222 by a left-backlight control unit 202 to thereby control presence or absence of generation and emission of image lights by each of the right display driving unit 22 and the left display driving unit 24. Details are explained later.

The sound processing unit 170 acquires a sound signal included in the contents, amplifies the acquired sound signal, and supplies the sound signal to the right earphone 32 and the left earphone 34 of the image display unit 20 via the connecting unit 40.

The image display unit 20 includes the right display driving unit 22, the left display driving unit 24, a right light guide plate 261 functioning as the right optical panel 26, a left light guide plate 262 functioning as the left optical panel 28, the illuminance sensor 25, the right earphone 32, and the left earphone 34. The right display driving unit 22 includes the right-backlight (BL) control unit 201 and the right-backlight (BL) 221 functioning as a light source, the right LCD-control unit 211 and the right LCD 241 functioning as a display device, a right temperature detecting unit 231 functioning as the temperature detecting unit for right eye, and a right projection optical system 251. The left display driving unit 24 includes the left-backlight (BL) control unit 202 and the left-backlight (BL) 222 functioning as a light source, the left-LCD control unit 212 and the left LCD 242 functioning as a display device, a left temperature detecting unit 232 functioning as the temperature detecting unit for left eye, and a left projection optical system 252. The right display driving unit 22 and the left display driving unit 24 form a pair. The units of the left display driving unit 24 have configurations and perform operations same as those of the units of the right display driving unit 22 explained below. Therefore, detailed explanation of the units of the left display driving unit 24 is omitted.

The right-backlight control unit 201 includes a function of driving the right backlight 221 on the basis of a control signal input via the connecting unit 40. The right backlight 221 is, for example, a light emitting member such as an LED. The right LCD-control unit 211 has a function of driving the right LCD 241 on the basis of the vertical synchronization signal VSync, the horizontal synchronization signal HSync, and the image data for right eye input via the connecting unit 40. The right LCD 241 is a transmissive liquid crystal panel in which plural pixels are arranged in a matrix shape. The right LCD 241 has a function of driving liquid crystals corresponding to the positions of the pixels arranged in the matrix shape to thereby change the transmittance of light transmitted through the right LCD 241 to modulate illumination light irradiated from the right backlight 221 into effective image light representing an image. The right-backlight control unit 201, the right LCD-control unit 211, the right backlight 221, and the right LCD 241 are generally referred to as "image-light generating unit for right eye". Similarly, the left-backlight control unit 202, the left-LCD control unit 212, the left backlight 222, and the left LCD 242 are generally referred to as "image-light generating unit for left eye". In this embodiment, the backlight system is adopted. However, image light may be emitted using a front light system or a reflection system.

The right projection optical system 251 includes a collimate lens that converts image light emitted from the right LCD 241 into light beams in a parallel state. The right light guide plate 261 functioning as the right optical panel 26 guides the image light output from the right projection optical system 251 to the right eye of the user while reflecting the image light along a predetermined optical path. The right projection optical system 251 and the right light guide plate 261 are generally referred to as "light guide unit".

The right temperature detecting unit 231 is attached to an end of the right LCD 241 and includes a function of detecting the temperature of the right LCD 241. The right temperature detecting unit 231 includes, for example, a thermistor, a temperature sensor IC, and a fuse. The right temperature detecting unit 231 may be configured as a non-contact temperature sensor besides a contact temperature sensor.

Figure 3:
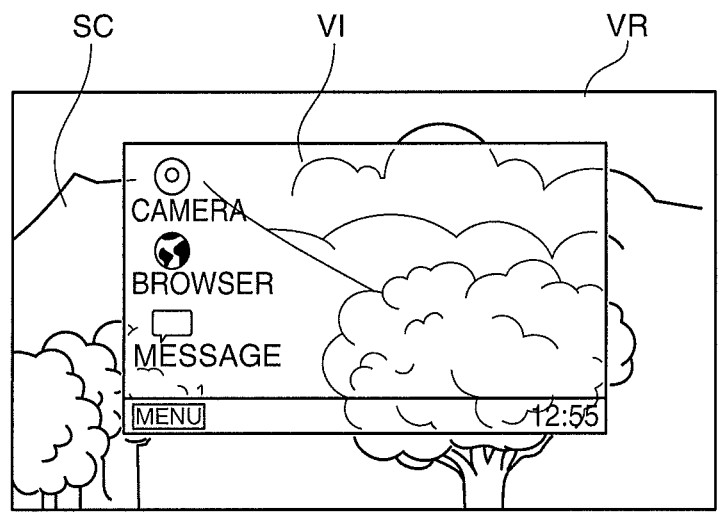
FIG. 3 is an explanatory diagram showing an example of a virtual image recognized by a user.

FIG. 3 is an explanatory diagram showing an example of a virtual image recognized by the user. The image lights guided to the eyes of the user of the head mounted display HM form images on the retinas of the user as explained above, whereby the user can visually recognize a virtual image. As shown in FIG. 3, a virtual image VI is displayed in a visual field VR of the user of the head mounted display HM. In the visual field VR of the user except a portion where the virtual image VI is displayed, the user can see an external scene SC through the right optical panel 26 and the left optical panel 28. In the head mounted display HM in this embodiment, in the portion where the virtual image VI is displayed in the visual field VR of the user, the user can also see the external scene SC in the background of the virtual image VI.

A-2. State Transition of the Head-Mounted Display Device

Figure 4:
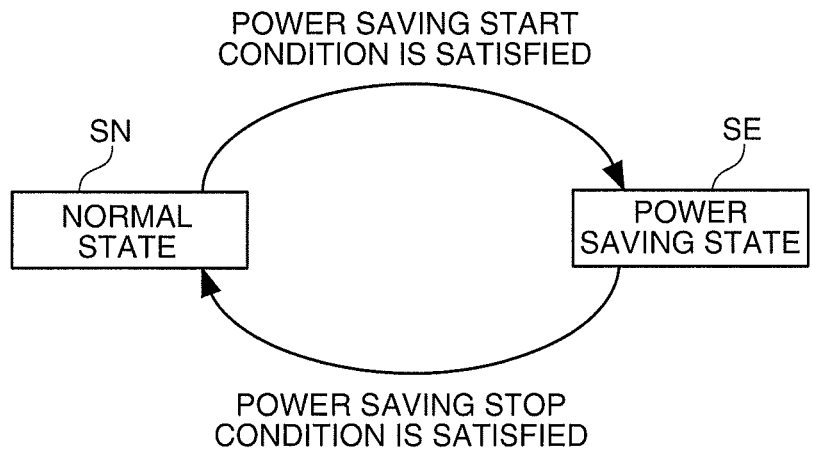
FIG. 4 is a state transition diagram showing states that the head mounted display could take.

FIG. 4 is a state transition diagram showing states that the head mounted display HM could take. The head mounted display HM in this embodiment can take a normal state SN and a power saving state SE. In the normal state SN, generation and emission of image light are performed by both the image-light generating unit for right eye and the image-light generating unit for left eye of the head mounted display HM. Therefore, in the normal state SN, a virtual image is displayed before the left and right eyes of the user. On the other hand, in the power saving state SE, the generation and the emission of image light are performed by one of the image-light generating unit for right eye and the image-light generating unit for left eye of the head mounted display HM. Therefore, in the power saving state SE, a virtual image is displayed before the left or right eye of the user.

When the head mounted display HM is in the normal state SN, the display control unit 190 monitors whether a power saving start condition is satisfied. After the power saving start condition is satisfied, the display control unit 190 transitions the head mounted display HM to the power saving state SE. When the head mounted display HM is in the power saving state SE, the display control unit 190 monitors whether a power saving stop condition is satisfied. After the power saving stop condition is satisfied, the display control unit 190 transitions the head mounted display HM to the normal state SN. A state that the head mounted display HM takes first when started (an initial state) may be either the normal state SN or the power saving state SE.

A-2-1. Power Saving Start Condition

The power saving start condition can be arbitrarily set. For example, one or plural conditions can be selected out of conditions (a1) to (a7) listed below.

(a1) Content is a still image. The still image means an image having a main purpose of displaying information such as an initial screen of an OS, a screen of document creation software or mail software started on the OS, or a play list display screen for music. The display control unit 190 can determine, according to the type of an application started on the OS, whether the content is a still image. If the condition (a1) is selected as the power saving start condition, the head mounted display HM can take the power saving state SE according to the type of a target image. Therefore, it is possible to realize low power consumption according to the type of the target image. When the content is a still image, even in the power saving state SE for displaying a virtual image before one eye of the user, the user can easily recognize the virtual image displayed in a visual field area.

(a2) The remaining power of the power supply 130 (the secondary battery) is equal to or smaller than predetermined remaining power. The predetermined remaining power can be arbitrarily set and is stored in the setting information CI in the storing unit 120. If the condition (a2) is selected as the power saving start condition, the head mounted display HM can take the power saving state SE when the remaining power of the secondary battery runs short. Therefore, it is possible to realize low power consumption when the remaining power of the secondary battery runs short. As a result, when the remaining power of the battery runs short in the head mounted display HM that can be battery-driven, it is possible to increase an operating time of the battery.

(a3) Illuminance acquired by the illuminance sensor 25 is equal to or lower than predetermined illuminance. The predetermined illuminance can be arbitrarily set and is stored in the setting information CI in the storing unit 120. If the condition (a3) is selected as the power saving start condition, the head mounted display HM can take the power saving state SE when the ambient brightness is equal to or lower than the predetermined illuminance, i.e., when the environment is dark. Therefore, it is possible to realize low power consumption when the environment is dark. When the environment is dark, even in the power saving state SE for displaying a virtual image before one eye of the user, the user can easily recognize the virtual image displayed in the visual field area.

(a4) One of the temperature of the right LCD 241 detected by the right temperature detecting unit 231 and the temperature of the left LCD 242 detected by the left temperature detecting unit 232 is equal to or higher than predetermined temperature. The predetermined temperature can be arbitrarily set and is stored in the setting information CI in the storing unit 120. If the condition (a4) is selected as the power saving start condition, the head mounted display HM can take the power saving state SE when the temperature of the image-light generating unit for right eye or the image-light generating unit for left eye is equal to or higher than predetermined temperature, i.e., when the temperature of the left or right image-light generating units rises. Therefore, it is possible to realize low power consumption when the temperature of the left or right image-light generating units is high. It is desirable to suppress the rise in the temperature of the image-light generating unit because the rise in the temperature leads to a failure of the LCD. Consequently, since the low power consumption is realized when the temperature of the left or right image-light generating unit is high, it is possible to suppress a further rise in the temperature of the image-light generating unit.

(a5) Startup of an application designated in advance in the OS is detected. As the designation of the application, for example, designation by the user is possible. Content of the designation is stored in the setting information CI in the storing unit 120. If the condition (a5) is selected as the power saving start condition, the head mounted display HM can take the power saving state SE according to the startup of the application designated in advance.

(a6) A power saving request is acquired from the outside. Specifically, the display control unit 190 acquires a request for selection of power saving via the touch pad 14 or the cross key 16 provided in the controller 10. If the condition (a6) is selected as the power saving start condition, the head mounted display HM can take the power saving state SE according to operation from the touch pad 14 or the cross key 16.

(a7) A state in which operation for the head mounted display HM (e.g., operation for the touch pad 14 and the cross key 16) is not detected continues for a predetermined time. The predetermined time can be arbitrarily set and is stored in the setting information CI in the storing unit 120. If the condition (a7) is selected as the power saving start condition, the head mounted display HM can take the power saving state SE when operation for the head mounted display HM is not performed for a long time.

(A-2-2) Power Saving Stop Condition

The power saving stop condition can be arbitrarily set. For example, one or plural conditions can be selected out of conditions listed below. In the following explanation, when a number affixed to the end of a reference number of the power saving stop condition is the same as a number affixed to a reference number of the power saving start condition, the power saving stop condition corresponds to the power saving start condition. The power saving stop condition is desirably a condition corresponding to the power saving start condition. Specifically, when the power saving start condition is the condition (a1), the power saving stop condition is desirably a condition (b1).

(b1) Content is a moving image. The moving image means an image having a main purpose of displaying a video such as a screen for displaying a video and a game screen. It is possible to determine, according to the type of an application started on the OS, whether the content is a moving image. When a displayed image is a moving image that constantly changes, the head mounted display HM takes the normal state SN, whereby a virtual image is displayed before the left and right eyes of the user. If the power saving stop condition (b1) and the power saving start condition (a1) are used as a set, it is possible to secure visibility of the user while realizing low power consumption in the head mounted display HM.

(b2) The remaining power of the power supply 130 (the secondary battery) exceeds the predetermined remaining power. If the power saving stop condition (b2) and the power saving start condition (a2) are used as a set, the head mounted display HM transitions to the normal state SN when the battery remaining power of the head mounted display HM exceeds the predetermined remaining power (i.e., charging is performed). A virtual image is displayed before the left and right eyes of the user. As a result, it is possible to improve visibility of the user while realizing low power consumption.

(b3) Illuminance acquired by the illuminance sensor 25 exceeds the predetermined illuminance. If the power saving stop condition (b3) and the power saving start condition (a3) are used as a set, the head mounted display HM transitions to the normal state SN when the environment is bright and the user can less easily recognize a virtual image. A virtual image is displayed before the left and right eyes of the user. As a result, it is possible to secure visibility of the user while realizing low power consumption.

(b4) Both the temperature of the right LCD 241 detected by the right temperature detecting unit 231 and the temperature of the left LCD 242 detected by the left temperature detecting unit 232 are lower than the predetermined temperature. If the power saving stop condition (b4) and the power saving start condition (a4) are used as a set, the head mounted display HM transitions to the normal state SN when the temperatures of the left and right image-light generating units fall. A virtual image is displayed before the left and right eyes of the user. As a result, it is possible to secure visibility of the user while realizing low power consumption.

(b5) The end of an application set in advance in the OS is detected. If the power saving stop condition (b5) and the power saving start condition (a5) are used as a set, the head mounted display HM can switch the normal state SN and the power saving state SE according to the startup and the end of a specific application designated in advance by the user or the like.

(b6) A power saving release request is received from the outside. Specifically, the display control unit 190 acquires a request for release of the power saving state via the touch pad 14 or the cross key 16 provided in the controller 10. If the power saving stop condition (b6) and the power saving start condition (a6) are used as a set, the head mounted display HM can switch the normal state SN and the power saving state SE according to a request from the outside.

(b7) Operation for the head mounted display HM (e.g., operation for the touch pad 14 and the cross key 16) is detected. If the power saving stop condition (b7) and the power saving start condition (a7) are used as a set, it is possible to realize lower power consumption in the head mounted display HM.

Figure 5:
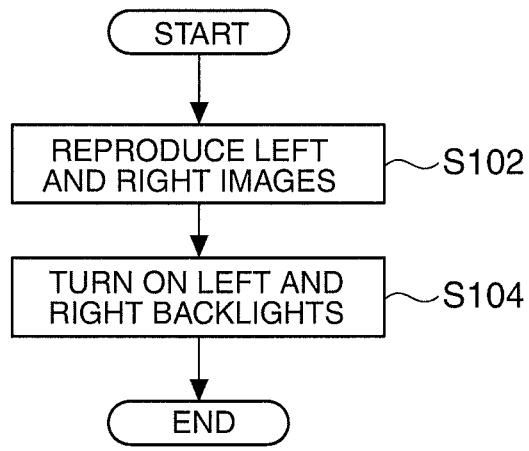
FIG. 5 is a flowchart for explaining a procedure of processing performed when the head mounted display transitions to a normal state.

FIG. 5 is a flowchart for explaining a procedure of processing performed when the head mounted display HM transitions to the normal state SN. The display control unit 190 reproduces left and right images (step S102). Specifically, the display control unit 190 transmits control signals indicating "effective" respectively to the right-LCD control unit 211 and the left-LCD control unit 212. The right-LCD control unit 211 that receives the control signal indicating "effective" drives the right LCD 241 and generates an image on the basis of image data for right eye input to the right-LCD control unit 211. The same applies to the left-LCD control unit 212. Subsequently, the display control unit 190 turns on the left and right backlights (step S104). Specifically, the display control unit 190 transmits control signals indicating "effective" respectively to the right-backlight control unit 201 and the left-backlight control unit 202.

The right-backlight control unit 201 that receives the control signal indicating "effective" turns on the right backlight 221 to irradiate illumination light on the image generated by the right LCD 241 and emits image light representing the image. The same applies to the left-backlight control unit 202.

Figure 6A:
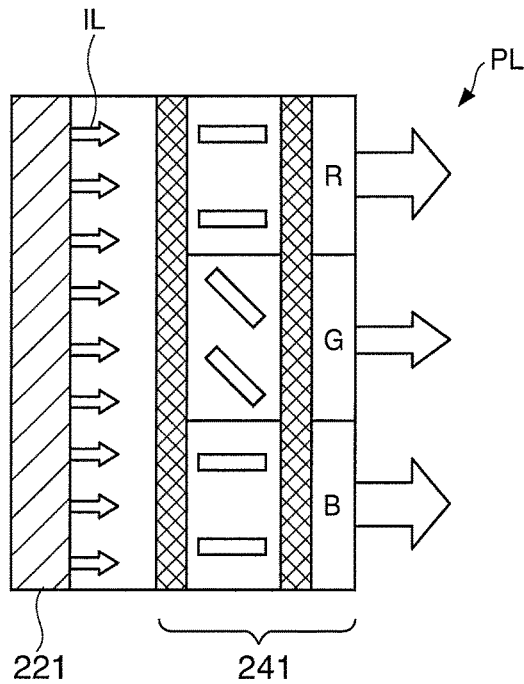
FIGS. 6A and 6B are explanatory diagrams showing a state in which image light is emitted through the processing shown in FIG. 5.
Figure 6B:
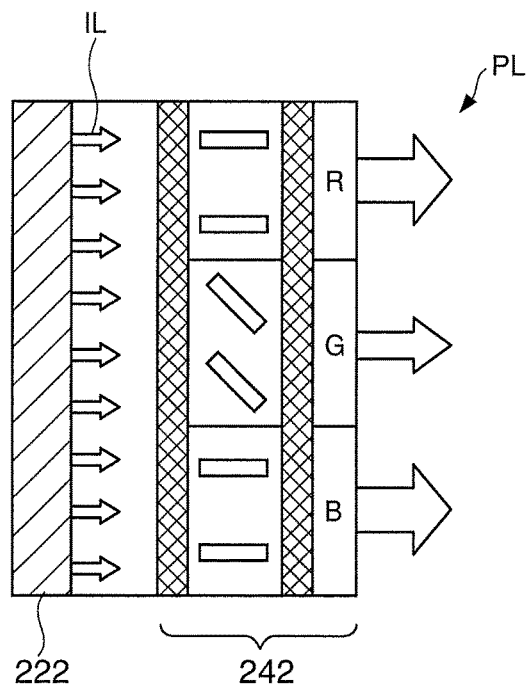

FIGS. 6A and 6B are explanatory diagrams showing a state in which image light is emitted through the processing shown in FIG. 5. FIG. 6A shows a state in which image light PL is emitted by irradiation of illumination light IL in the image-light generating unit for right eye. FIG. 6B shows a state in which the image light PL is emitted by irradiation of the illumination light IL in the image-light generating unit for left eye. As a result, the generation and the emission of image light are performed by both the image-light generating unit for right eye and the image-light generating unit for left eye of the head mounted display HM. Therefore, in the normal state SN, a virtual image is displayed before the left and right eyes of the user. In the normal state SN, the irradiation of the illumination light (step S104) is performed after the generation of the image light (step S102). Therefore, it is possible to suppress flickering in display of a virtual image and smoothly perform display of the virtual image.

Figure 7:
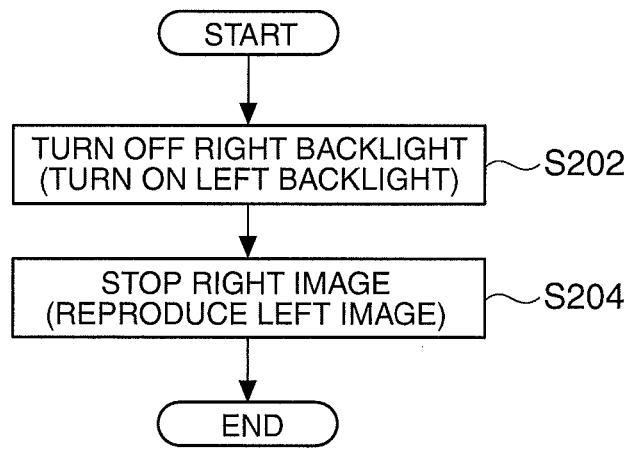
FIG. 7 is a flowchart for explaining a procedure of processing performed when the head mounted display transitions to a power saving state.

FIG. 7 is a flowchart for explaining a procedure of processing performed when the head mounted display HM transitions to the power saving state SE. The display control unit 190 turns off the right backlight 221 (step S202). Specifically, the display control unit 190 transmits a control signal indicating "ineffective" to the right-backlight control unit 201 and transmits a control signal indicating "effective" to the left-backlight control unit 202. The right-backlight control unit 201 that receives the control signal indicating "ineffective" turns off illumination light of the right backlight 221. Therefore, an image generated by the right LCD 241 is not emitted as image light. On the other hand, the left-backlight control unit 202 that receives the control signal indicating "effective" keeps illumination light of the left backlight 222 on. Therefore, an image generated by the left LCD 242 is emitted as image light.

Figure 8A:
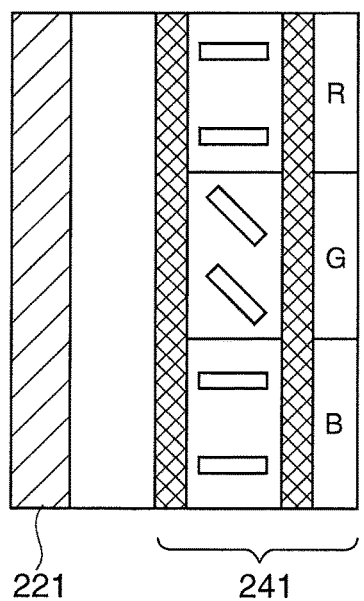
FIGS. 8A and 8B are explanatory diagrams showing states of image-light generating units at a point when processing in step S202 in FIG. 7 ends.
Figure 8B:
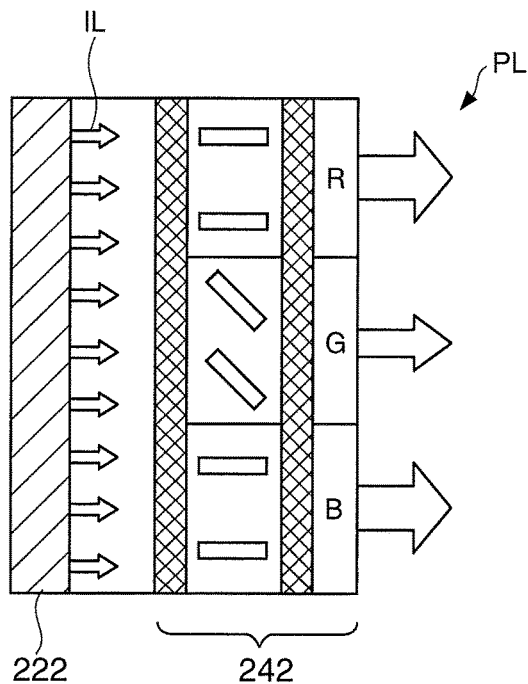

FIGS. 8A and 8B are explanatory diagrams showing states of the image-light generating units at a point when the processing in step S202 in FIG. 7 ends. As shown in FIG. 8A, in the image-light generating unit for right eye, the illumination light is turned off, whereby the emission of the image light is stopped. On the other hand, as shown in FIG. 8B, in the image-light generating unit for left eye, the emission of the image light PL is continued by the irradiation of the illumination light IL.

Subsequently, in step S204 in FIG. 7, the display control unit 190 stops reproduction of a right image. Specifically, the display control unit 190 transmits a control signal indicating "ineffective" to the right-LCD control unit 211 and transmits a control signal indicating "effective" to the left-LCD control unit 212. The right-LCD control unit 211 that receives the control signal indicating "ineffective" stops driving of the right LCD 241. Consequently, the generation of an image by the LCD is stopped. On the other hand, the left-LCD control unit 212 that receives the control signal indicating "effective" continues driving of the left LCD 242.

As a result, the generation and the emission of image light by the image-light generating unit for right eye of the head mounted display HM are stopped. Only the image-light generating unit for left eye performs the generation and the emission of image light. Therefore, in the power saving state SE, a virtual image is displayed before the left eye of the user. In the power saving state SE, the stop of the image light (step S204) is performed after the stop of the irradiation of the illumination light (step S202). Therefore, it is possible to suppress flickering during the stop of the virtual image display and smoothly extinguish the virtual image.

In this embodiment, in the power saving state SE, a virtual image is displayed before the left eye of the user, i.e., the generation and the emission of image light by the image-light generating unit for right eye are stopped. However, the display of a virtual image and the stop of the generation and the emission of image light may be reversed. In other words, the generation and the emission of image light by the image-light generating unit for left eye may be stopped. In the power saving state SE, the user can designate which of the image-light generating unit for right eye and the image-light generating unit for left eye is stopped. Specifically, the user selects one of the image-light generating unit for right eye and the image-light generating unit for left eye, the generation and the emission of image light by which are stopped, by operating the touch pad 14 or the cross key 16 provided in the controller 10 functioning as the selection receiving unit.

Figure 9A:
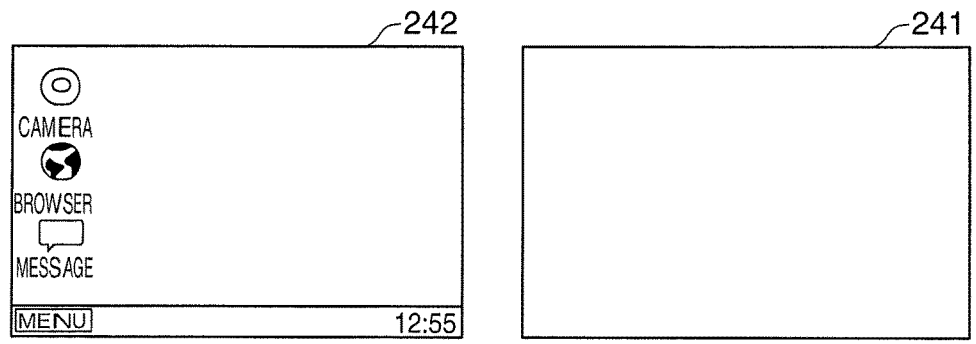
FIGS. 9A to 9C are explanatory diagrams showing an example of state transition of the head mounted display.
Figure 9B:
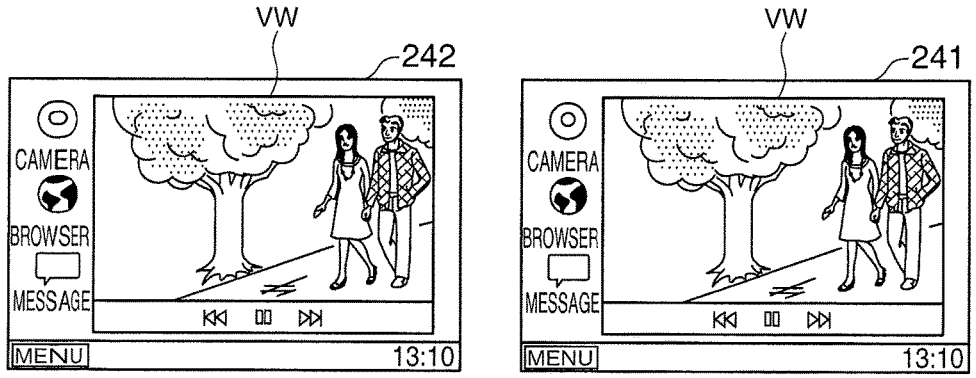
Figure 9C:
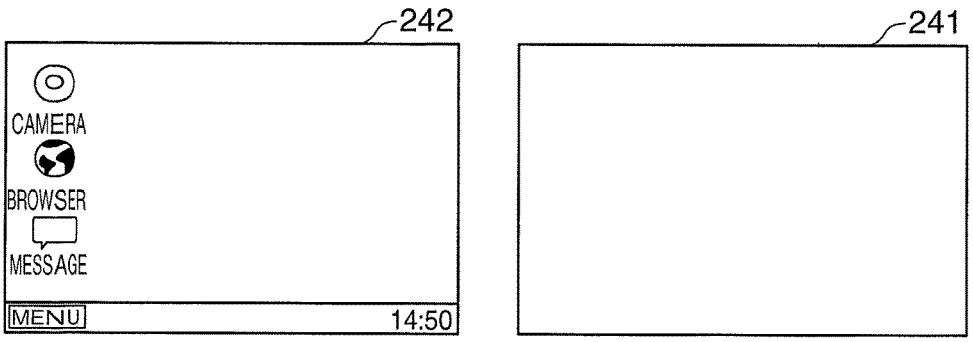

FIGS. 9A to 9C are explanatory diagrams showing an example of state transition of the head mounted display HM. In the example shown in FIGS. 9A to 9C, the initial state of the head mounted display HM is the power saving state SE, the condition (a1) is adopted as the power saving start condition, and the condition (b1) is adopted as the power saving stop condition.

FIG. 9A shows states of the right LCD 241 and the left LCD 242 at time t1 when the head mounted display HM is started. Since the initial state of the head mounted display HM is the power saving state SE, during the startup of the head mounted display HM, the display control unit 190 executes the processing performed when the head mounted display HM transitions to the power saving state SE (FIG. 7). As a result, the generation and the emission of image light are performed by only the image-light generating unit for left eye (the left LCD 242) of the head mounted display HM. A virtual image based on image light shown in FIG. 9A is displayed before the left eye of the user.

FIG. 9B shows states of the right LCD 241 and the left LCD 242 at time t2 when reproduction of a moving image is started in the head mounted display HM. When the display control unit 190 detects startup of an application for reproducing a moving image (a video) (a moving image viewer VW), the display control unit 190 determines that the power saving stop condition (b1) is satisfied and executes the processing performed when the head mounted display HM transitions to the normal state SN (FIG. 5). As a result, the generation and the emission of image light are performed by both the image-light generating unit for right eye (the right LCD 241) and the image-light generating unit for left eye (the left LCD 242) of the head mounted display HM. A virtual image based on image light shown in FIG. 9B is displayed before the left and right eyes of the user.

FIG. 9C shows states of the right LCD 241 and the left LCD 242 at time t3 when the reproduction of the moving image ends in the head mounted display HM. When the display control unit 190 detects the end of the moving image viewer VW and detects that display of the head mounted display HM changes to the initial screen display of the OS, the display control unit 190 determines that the power saving start condition (a1) is satisfied and executes the processing performed when the head mounted display HM transitions to the power saving state SE (FIG. 7). As a result, the generation and the emission of image light are performed by only the image-light generating unit for left eye (the left LCD 242) of the head mounted display HM. A virtual image based on image light shown in FIG. 9C is displayed before the left eye of the user.

As explained above, in the first embodiment, the display control unit 190 can control, with a control signal, the generation and the emission of image light by each of the image-light generating unit for right eye and the image-light generating unit for left eye. Therefore, the display control unit 190 can realize the normal state SN in which the generation and the emission of image light are performed by both the image-light generating unit for right eye and the image-light generating unit for left eye and the power saving state SE in which the generation and the emission of image light are performed by one of the image-light generating unit for right eye and the image-light generating unit for left eye. In the power saving state SE, a virtual image is displayed before one eye (the left or right eye) of the user. Even the virtual image displayed before one eye can be recognized as one virtual image VI displayed in the visual field of the user as in FIG. 3 if the user is conscious of the virtual image. Electric power for driving the LCDs accounts for about ⅓ of electric power consumed by the head mounted display HM as a whole. Therefore, in the power saving state SE in which only one of the left and right LCDs has to be driven, it is possible to suppress power consumption of the head mounted display HM as a whole compared with the normal state SN. As a result, in the head mounted display HM, it is possible to realize low power consumption without deteriorating the image quality of the virtual image that the user recognizes.

B. Second Embodiment

In a second embodiment of the invention, in the power saving state SE, a configuration for causing the image-light generating unit for right eye and the image-light generating unit for left eye to alternately display a virtual image is explained. In the following explanation, only components that have configurations and perform operations different from those in the first embodiment are explained. In the figures, components same as those in the first embodiment are denoted by reference numerals and signs same as those in the first embodiment explained above and detailed explanation of the components is omitted.

B-1. Configuration of the Head-Mounted Display Device

The configuration of the head mounted display HM in the second embodiment is the same as the configuration in the first embodiment explained with reference to FIGS. 1 to 3.

B-2. State Transition of the Head-Mounted Display Device

Figure 10:
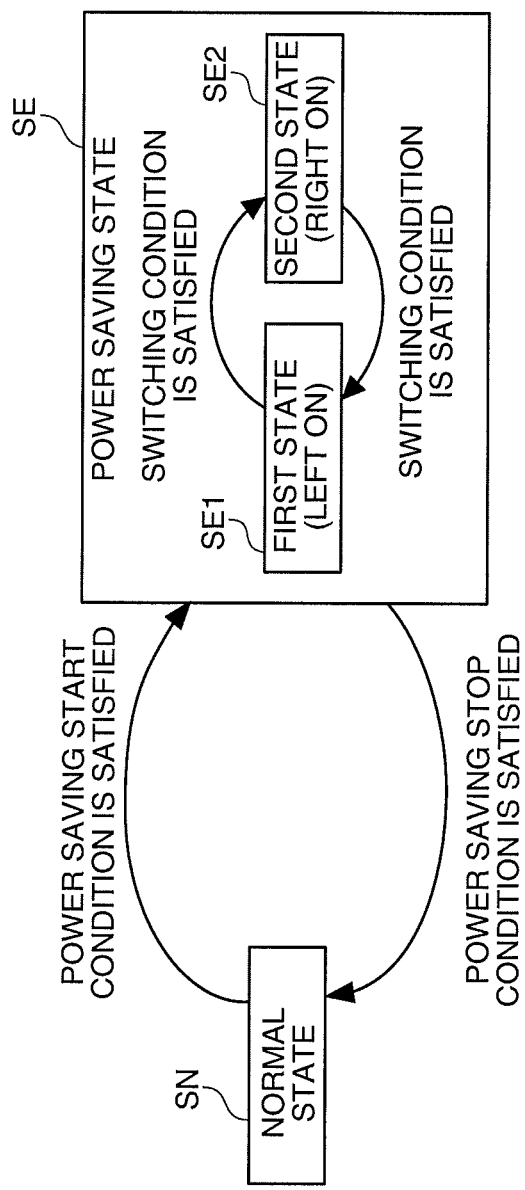
FIG. 10 is a state transition diagram showing states that a head mounted display in a second embodiment could take.

FIG. 10 is a state transition diagram showing states that the head mounted display HM in the second embodiment could take. A difference from the state transition in the first embodiment shown in FIG. 4 is only that in the power saving state SE, the head mounted display HM takes a first state SE1 and a second state SE2. The other operations are the same as those in the first embodiment. In the first state SE1, generation and emission of image light are performed by the image-light generating unit for left eye of the head mounted display HM. Generation and emission of image light are stopped by the image-light generating unit for right eye of the head mounted display HM. Therefore, in the first state SE1, a virtual image is displayed before the left eye of a user. In the second state SE2, generation and emission of image light are performed by the image-light generating unit for right eye of the head mounted display HM. Generation and emission of image light are stopped in the image-light generating unit for left eye of the head mounted display HM. Therefore, in the second state SE2, a virtual image is displayed before the right eye of the user.

When the head mounted display HM is in the power saving state SE, the display control unit 190 monitors whether a switching condition is satisfied. After the switching condition is satisfied, when the head mounted display HM is in the first state SE1, the display control unit 190 transitions the head mounted display HM to the second state SE2. When the head mounted display HM is in the second state SE2, the display control unit 190 transitions the head mounted display HM to the first state SE1. A state that the head mounted display HM takes first when transitioning to the power saving state SE may be either the first state SE1 or the second state SE2.

B-2-1. Switching Condition

The switching condition can be arbitrarily set. For example, one or plural conditions may be selected out of conditions listed below.

(c1) After state transition, a fixed time elapses. The fixed time can be arbitrarily set. For example, the fixed time may be several minutes or may be, for example, a time until thirty frames are displayed. If the condition (c1) is selected as the switching condition, it is possible to equally switch the image-light generating unit for right eye and the image-light generating unit for left eye.

(c2) A difference between the temperature of the right LCD 241 detected by the right temperature detecting unit 231 and the temperature of the left LCD 242 detected by the left temperature detecting unit 232 is equal to or larger than a predetermined temperature difference. The predetermined temperature difference can be arbitrarily set and is stored in the setting information CI in the storing unit 120. If the condition (c2) is selected as the switching condition, it is possible to switch the image-light generating unit for right eye and the image-light generating unit for left eye to perform the generation and the emission of image light using the image-light generating unit on a side where the generation and the emission of image light are stopped (i.e., a side where the temperature of the LCD is low). As a result, the first state SE1 and the second state SE2 can be switched according to the temperatures of the LCDs. Therefore, it is possible to suppress the temperature of only one image-light generating unit from rising.

A procedure of processing performed when the head mounted display HM transitions to the first state SE1 is the same as the procedure shown in FIG. 7. As a result, the generation and the emission of image light by the image-light generating unit for right eye of the head mounted display HM are stopped and only the image-light generating unit for left eye performs the generation and the emission of image light. Therefore, in the first state SE1, a virtual image is displayed before the left eye of the user.

Figure 11:
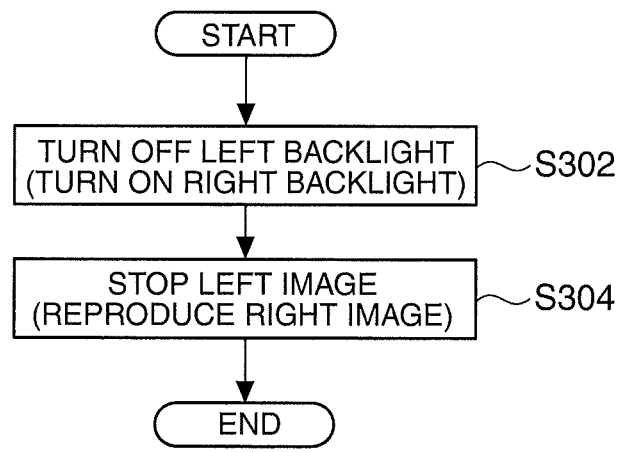
FIG. 11 is a flowchart for explaining a procedure of processing performed when the head mounted display in the second embodiment transitions to a second state.
Figure 12A:
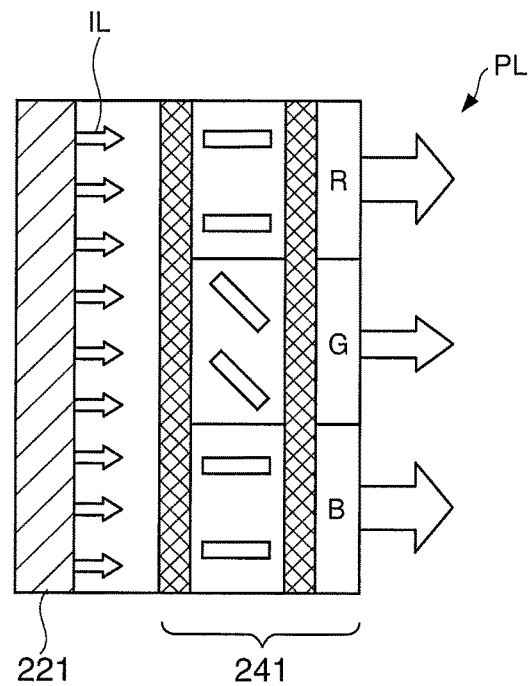
FIGS. 12A and 12B are explanatory diagrams showing states of image-light generating units at a point when processing in step S302 in FIG. 11 ends.
Figure 12B:
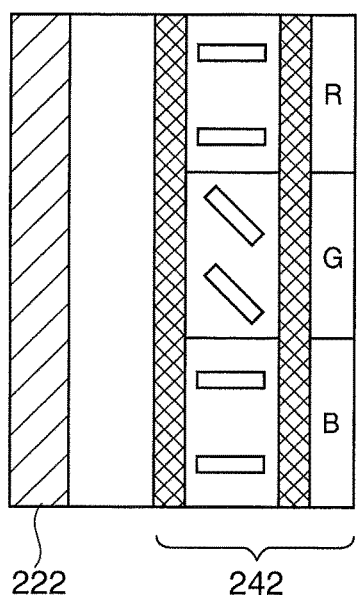

FIG. 11 is a flowchart for explaining a procedure of processing performed when the head mounted display HM in the second embodiment transitions to the second state SE2. The display control unit 190 turns off the left backlight 222 (step S302). Specifically, the display control unit 190 transmits a control signal indicating "effective" to the right-backlight control unit 201 and transmits a control signal indicating "ineffective" to the left-backlight control unit 202. The right-backlight control unit 201 that receives the control signal indicating "effective" keeps illumination light of the right backlight 221 on. Therefore, an image generated by the right LCD 241 is emitted as image light. On the other hand, the left-backlight control unit 202 that receives the control signal indicating "ineffective" turns off illumination light of the left backlight 222. Therefore, an image generated by the left LCD 242 is not emitted as image light. FIGS. 12A and 12B are explanatory diagrams showing states of the image-light generating units at a point when the processing in step S302 in FIG. 11 ends.

Subsequently, the display control unit 190 stops the reproduction of the left image (step S304). Specifically, the display control unit 190 transmits a control signal indicating "effective" to the right-LCD control unit 211 and transmits a control signal indicating "ineffective" to the left-LCD control unit 212. The right-LCD control unit 211 that receives the control signal indicating "effective" continues driving of the right LCD 241. On the other hand, the left-LCD control unit 212 that receives the control signal indicating "ineffective" stops driving of the left LCD 242. Consequently the generation of the image by the left LCD 242 is stopped. As a result, the generation and the emission of image light by the image-light generating unit for left eye of the head mounted display HM are stopped. Only the image-light generating unit for right eye performs the generation and the emission of image light. Therefore, in the second state SE2, a virtual image is displayed before the right eye of the user. Step S204 of the processing performed when the head mounted display HM transitions to the first state SE1 (FIG. 7) and step S304 of the processing performed when the head mounted display HM transitions to the second state SE2 can be omitted. Then, presence or absence of display of a virtual image can be switched by only turning on and off the backlights. Therefore, it is possible to quickly switch the first state SE1 and the second state SE2.

Figure 13A:
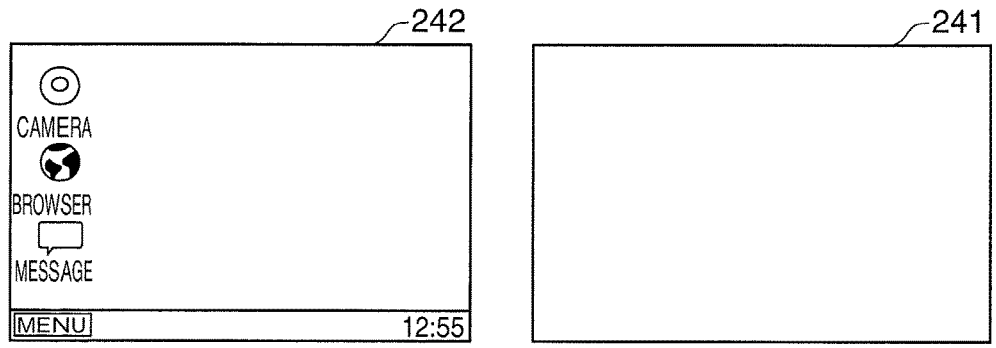
FIGS. 13A and 13B are explanatory diagrams showing an example of state transition of the head mounted display in the second embodiment.
Figure 13B:
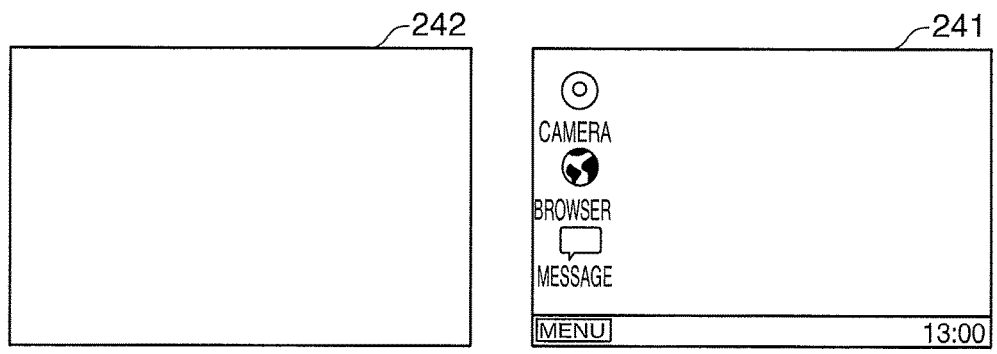

FIGS. 13A and 13B are explanatory diagrams showing an example of state transition of the head mounted display HM in the second embodiment. In the example shown in FIGS. 13A and 13B, a state that the head mounted display HM takes first when transitioning to the power saving state SE is the first state SE1 and the condition (c1) is adopted as the switching condition.

FIG. 13A shows states of the right LCD 241 and the left LCD 242 at time t1 when the head mounted display HM transitions to the power saving state SE. When the head mounted display HM transitions to the power saving state SE, the display control unit 190 executes the processing performed when the head mounted display HM transitions to the first state SE1 (FIG. 7). As a result, the generation and the emission of image light are performed by only the image-light generating unit for left eye (the left LCD 242) of the head mounted display HM. A virtual image based on image light shown in FIG. 13A is displayed before the left eye of the user.

FIG. 13B shows states of the right LCD 241 and the left LCD 242 at time t2 after the elapse of a fixed time from time t1. After the head mounted display HM transitions to the first state SE1, when the fixed time elapses, the display control unit 190 determines that the switching condition (c1) is satisfied and executes the processing performed when the head mounted display HM transitions to the second state SE2 (FIG. 11). As a result, the generation and the emission of image light are performed by only the image-light generating unit for right eye (the right LCD 241) of the head mounted display HM. A virtual image based on image light shown in FIG. 13B is displayed before the right eye of the user.

As explained above, in the second embodiment, the display control unit 190 alternately switches, triggered by the satisfaction of the switching condition, the first state SE1 for causing one (the image-light generating unit for right eye) of the image-light generating unit for right eye and the image-light generating unit for left eye to stop the generation and the emission of image light and causing the other (the image-light generating unit for left eye) to execute the generation and the emission of image light and the second state SE2 for causing one (the image-light generating unit for right eye) to execute the generation and the emission of image light and causing the other (the image-light generating unit for left eye) to stop the generation and the emission of image light. Therefore, as in the first embodiment, in the head mounted display HM, it is possible to realize low power consumption without deteriorating the image quality of a virtual image recognized by the user. In the second embodiment, the display control unit 190 causes the image-light generating unit for right eye and the image-light generating unit for left eye to alternately display a virtual image. In this way, compared with continuous use of only one image-light generating unit, it is possible to suppress a rise in temperature, deterioration, and the like involved in continuous use of the LCD.

C. Third Embodiment

In a third embodiment of the invention, a configuration for switching, in switching the first state SE1 and the second state SE2, the first state SE1 and the second state SE2 through a third state for causing both the image-light generating unit for right eye and the image-light generating unit for left eye to display a virtual image is explained. In the figures, components same as those in the second embodiment are denoted by reference numerals and signs same as those in the second embodiment explained above and detailed explanation of the components is omitted.

C-1. Configuration of a Head-Mounted Display Device

The configuration of the head mounted display HM in the third embodiment is the same as the configuration in the first embodiment explained with reference to FIGS. 1 to 3.

C-2. State Transition of the Head-Mounted Display Device

Figure 14:
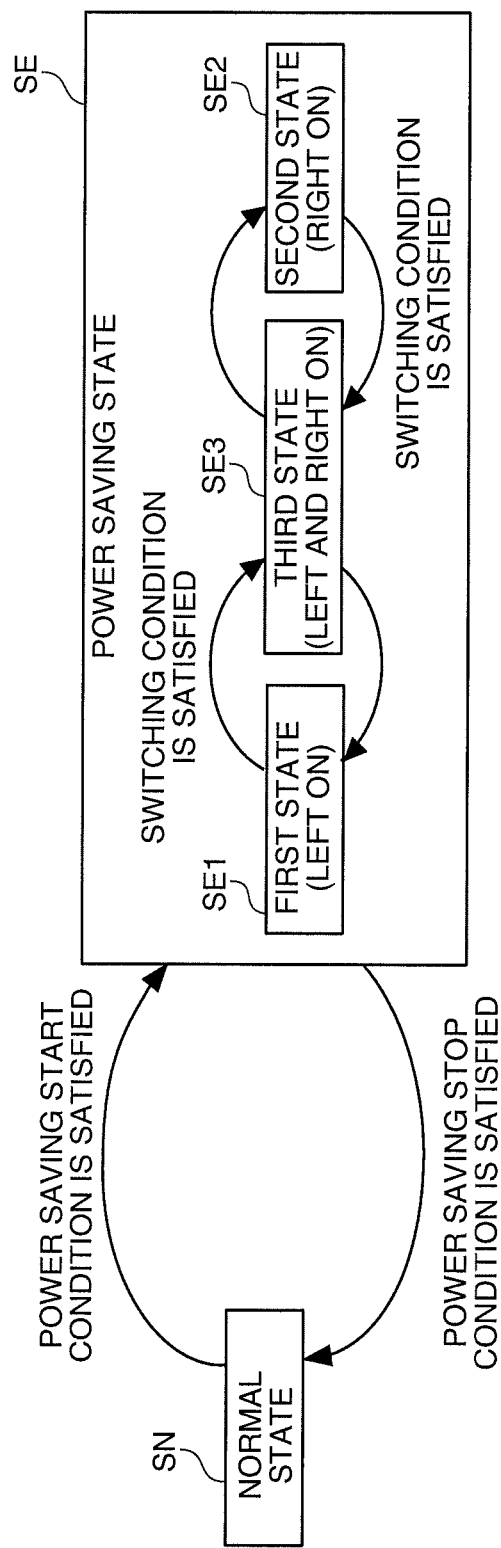
FIG. 14 is a state transition diagram showing states that a head mounted display in a third embodiment could take.

FIG. 14 is a state transition diagram showing states that the head mounted display HM in the third embodiment could take. A difference from the state transition in the second embodiment shown in FIG. 10 is only that the head mounted display HM further includes a third state SE3 between the first state SE1 and the second state SE2. The other operations are the same as those in the second embodiment. In the third state SE3, generation and emission of image light are performed by both the image-light generating unit for right eye and the image-light generating unit for left eye of the head mounted display HM. When the head mounted display HM is in the power saving state SE, the display control unit 190 monitors whether a switching condition is satisfied. After the switching condition is satisfied, when the head mounted display HM is in the first state SE1, the display control unit 190 transitions the head mounted display HM to the second state SE2 through the third state SE3. When the head mounted display HM is in the second state SE2, the display control unit 190 transitions the head mounted display HM to the first state SE1 through the third state SE3. A time during which the head mounted display HM stays in the third state SE3 can be set to an arbitrary time. However, the time is desirably set to a short time (several seconds).

A procedure of processing performed when the head mounted display HM transitions to the third state SE3 is the same as the procedure shown in FIG. 5. As a result, the generation and the emission of image light are performed by both the image-light generating unit for right eye and the image-light generating unit for left eye of the head mounted display HM. Therefore, in the third state SE3, a virtual image is displayed before the left and right eyes of a user.

Figure 15A:
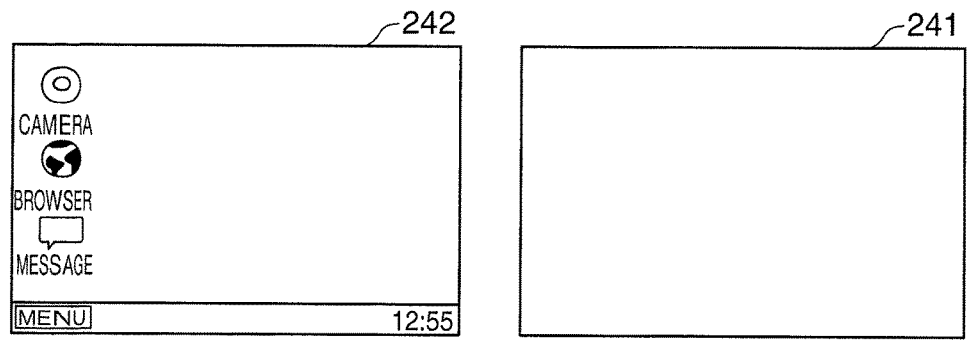
FIGS. 15A to 15C are explanatory diagrams showing an example of state transition of the head mounted display in the third embodiment.
Figure 15B:
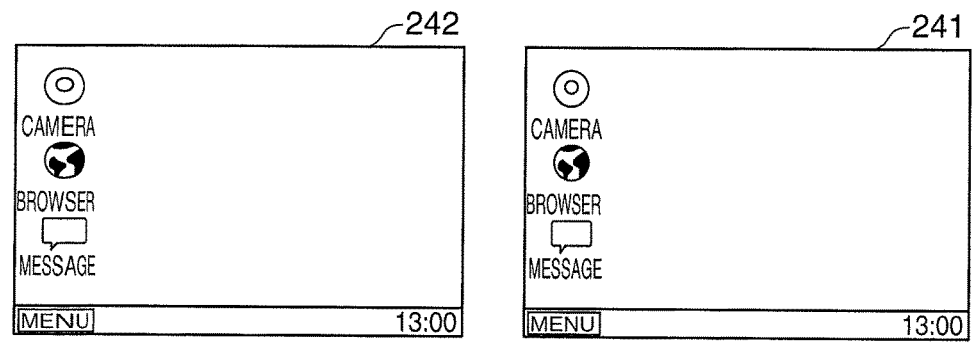
Figure 15C:
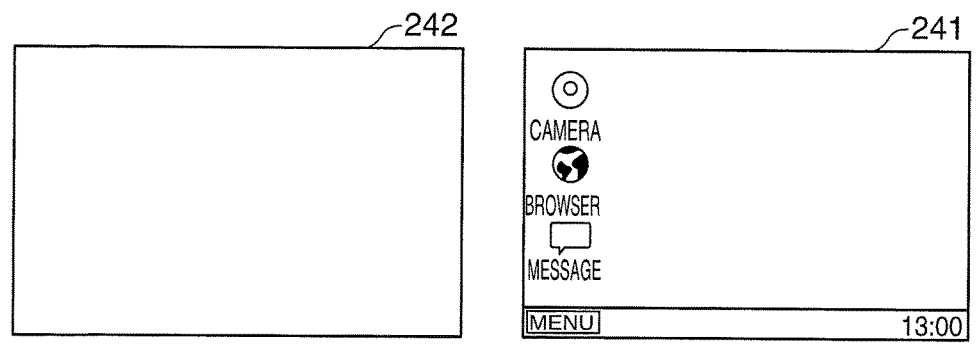

FIGS. 15A to 15C are explanatory diagrams showing an example of state transition of the head mounted display HM in the third embodiment. A difference from the state transition in the second embodiment shown in FIGS. 13A and 13B is that, after the head mounted display HM transitions to the first state SE1, when a fixed time elapses, the head mounted display HM transitions to the second state SE2 shown in FIG. 15C through the third state SE3 shown in FIG. 15B.

As explained above, in the third embodiment, in switching the first state SE1 and the second state SE2, the display control unit 190 switches the first state SE1 and the second state SE2 through the third state SE3 for causing both the image-light generating unit for right eye and the image-light generating unit for left eye to perform the generation and the emission of image light. As a result, it is possible to reduce a sense of discomfort that the user feels during the switching of the first state SE1 and the second state SE2 and more naturally perform the switching.

D. Modifications

The invention is not limited to the embodiments and can be carried out in various forms without departing from the spirit of the invention. For example, the functions realized by software may be realized by hardware. Besides, modifications explained below are possible.

D1. Modification 1

In the embodiments, the configuration of the head mounted display is exemplified. However, the configuration of the head mounted display can be arbitrarily set without departing from the spirit of the invention. For example, addition, deletion, conversion, and the like of the components can be performed.

For example, the configurations of the controller and the image display unit shown in FIG. 1 can be arbitrarily changed. Specifically, for example, the touch panel may be omitted from the controller and the controller may be operated only with the cross key. Other operation interfaces such as an operation stick may be provided in the controller. Input devices such as a keyboard and a mouse can be connected to the controller. The controller may receive inputs from the keyboard and the mouse. A communication unit employing Wi-Fi (wireless fidelity) may be provided in the controller.

For example, the controller shown in FIG. 1 is connected to the image display unit via a wired signal transmission line. However, the controller and the image display unit may be connected via a wireless signal transmission line such as a wireless LAN, infrared communication, or Bluetooth (registered trademark).

For example, the head mounted display is the transmissive head mounted display of a binocular type. However, the head mounted display may be configured as a non-transmissive head mounted display that blocks an external scene when the user wears the head mounted display. The head mounted display may be a head mounted display of a monocular type.

For example, the image-light generating unit for right eye is configured using the right-backlight control unit, the right-LCD control unit, the right backlight, and the right LCD. However, an organic EL (organic Electro-Luminescence) and an organic EL control unit may be used instead of the right-backlight control unit, the right-LCD control unit, the right backlight, and the right LCD. In the case of the organic EL, since deterioration involved in a temperature rise is severer than the deterioration of the LCD, the invention is particularly effective. The same applies to the image-light generating unit for left eye.

For example, the functional units such as the image processing unit, the display control unit, and the sound processing unit are described as being realized by the CPU expanding the computer program stored in the ROM or the hard disk on the RAM and executing the computer program. However, these functional units may be configured using an ASIC (Application Specific Integrated Circuit) designed to realize the functions.

For example, in the embodiments, the image display unit is the head mounted display worn like eyeglasses. However, the image display unit may be a normal flat display device (a liquid crystal display device, a plasma display device, an organic EL display device, etc.) In this case, as in the head mounted display, the controller and the image display unit may be connected via the wired signal transmission line or may be connected via the wireless signal transmission line. In this way, the controller can be used as a remote controller of the normal flat display device.

As the image display unit, an image display unit having another shape such as an image display unit worn like a cap may be adopted instead of the image display unit worn line eyeglasses. As the earphone, an ear hooking type or a headband type may be adopted. The earphone may be omitted.

For example, in the embodiments, the secondary battery is used as the power supply. However, the power supply is not limited to the secondary battery. Various batteries can be used as the power supply. For example, a primary battery, a fuel cell, a solar battery, a thermal battery, and the like may be used.

D2. Modification 2

In the embodiments, the image processing unit outputs the same image data as the image data for right eye and the image data for left eye. However, the image processing unit may be configured to be capable of causing the user to visually recognize a 3D virtual image by outputting different image data as the image data for right eye and the image data for left eye.

D3. Modification 3

In the first embodiment, the examples of the power saving start condition and the power saving stop condition are explained. However, the transition conditions explained in the first embodiment are only examples. Various conditions can be adopted.

For example, when the head mounted display can cause the user to visually recognize a 3D virtual image, the power saving start condition may be a condition that the head mounted display is in a mode for displaying a 3D virtual image. The power saving stop condition may be a condition that the head mounted display is in a mode for displaying a 2D virtual image.

D4. Modification 4

In the second embodiment, the example of the switching condition is explained. However, the switching condition explained in the second embodiment is only an example. Various conditions can be adopted.

D5. Modification 5

In the third embodiment, in the third state through which the first state and the second state are switched, a virtual image is displayed by both the image-light generating unit for right eye and the image-light generating unit for left eye. However, the third state may be a state for stopping the display of a virtual image in both the image-light generating unit for right eye and the image-light generating unit for left eye.

The entire disclosure of Japanese Patent Application Nos. 0.2011-026810, filed Feb. 10, 2011 and 2011-026809, filed Feb. 10, 2011 are expressly incorporated by reference herein.

What is claimed is:

1. A head-mounted display device for making a user recognize a virtual image in a state in which the head-mounted display device is mounted on a head of the user, the head-mounted display device comprising:
an image-light generating unit for the right eye of the user to generate an image light from image data for right eye of the user and to emit the image light;
an image-light generating unit for the left eye of the user to generate the image light from image data for the left eye of the user and to emit the image light;
a display control unit configured to control an emission of each of the image light respectively generated by the image-light generating unit for the right eye of the user and the image-light generating unit for the left eye of the user;
a temperature detecting unit for the right eye of the user that detects a temperature of the image-light generating unit for the right eye of the user; and
a temperature detecting unit for the left eye of the user that detects a temperature of the image-light generating unit for the left eye of the user, wherein
the display control unit controls the head-mounted display device to change its operation state, according to a condition set in advance, to a power saving state, wherein in the power saving state, the display control unit transitions the image-light emission of the image-light generating units among a first state in which only the image-light generating unit for the left eye of the user emits image light, a second state in which only the image-light generating unit for the right eye of the user emits image light, and a third state in which both the image-light generating units for the left eye of the user and for the right eye of the user emit image light, when a switching condition is satisfied, the display control unit is configured to transition the image-light emission of the image-light generating units from the first state to the second state through the third state,
when a first condition is selected, the display control unit is configured to transition the image-light emission of the image-light generating units from equally between the first state and the second state, and
when a second condition is selected, the display control unit is configured to transition the image-light emission of the image-light generating units from one of the first state and the second state to the other of the first state and the second state.

2. The head-mounted display device according to claim 1, wherein the condition set in advance is a condition that at least one of the temperature detected by the temperature detecting unit for the right eye of the user and the temperature detected by the temperature detecting unit for the left eye of the user is equal to or higher than a predetermined temperature.

3. The head-mounted display device according to claim 1, wherein the condition set in advance is a condition that a target image used for display of the virtual image is a still image.

4. The head-mounted display device according to claim 1, further comprising a battery that supplies electric power to the head-mounted display device, wherein
the condition set in advance is a condition that a remaining power of the battery is equal to or smaller than a predetermined remaining power.

5. The head-mounted display device according to claim 1, further comprising an illuminance acquiring unit that acquires an illuminance indicating ambient brightness, wherein
the condition set in advance is a condition that the acquired illuminance is equal to or lower than a predetermined illuminance.

6. The head-mounted display device according to claim 1, wherein the condition set in advance is any one of a condition that the head-mounted display device detects startup of an application designated in advance in an operating system installed in the head-mounted display device, a condition that the head-mounted display device acquires a request from an outside, and a condition that the head-mounted display device detects that a state in which operation for the head-mounted display device is not detected continues for a predetermined time.

7. The head-mounted display device according to claim 1, wherein when the second condition is selected and if the temperature of the image-light generating unit for the left eye of the user is lower than the temperature of the image-light generating unit for the right eye of the user, the display control unit is configured to transition to the first state.

8. The head-mounted display device according to claim 1, wherein when the second condition is selected and if the temperature of the image-light generating unit for the left eye of the user is higher than the temperature of the image-light generating unit for the right eye of the user, the display control unit is configured to transition to the second state.

9. A head-mounted display device for making a user recognize a virtual image in a state in which the head-mounted display device is mounted on a head of the user, the head-mounted display device comprising:
an image-light generating unit for the right eye of the user to generate an image light from image data for the right eye of the user and to emit the image light;

an image-light generating unit for the left eye of the user to generate the image light from image data for the left eye of the user and to emit the image light;

a display control unit configured to control an emission of each of the image light respectively generated by the image-light generating unit for the right eye of the user and the image-light generating unit for the left eye of the user;

a temperature detecting unit for the right eye of the user that detects a temperature of the image-light generating unit for the right eye of the user; and a temperature detecting unit for the left eye of the user that detects a temperature of the image-light generating unit for the left eye of the user, wherein the display control unit controls the head-mounted display device to change its operation state, according to conditions set in advance, between a power saving state, and a normal state which makes both of the image-light generating unit for the right eye of the user and the image-light generating unit for the left eye of the user execute the emission of the image light, wherein in the power saving state, the display control unit transitions the image-light emission of the image-light generating units among a first state in which only the image-light generating unit for the left eye of the user emits image light, a second state in which only the image-light generating unit for the right eye of the user emits image light, and a third state in which both the image-light generating units for the left eye of the user and for the right eye of the user emit image light, the conditions set in advance are a first condition that at least one of the temperature detected by the temperature detecting unit for the right eye of the user and the temperature detected by the temperature detecting unit for the left eye of the user is equal to or higher than a predetermined temperature, the first condition causing the head-mounted display device to change its operation state to the power saving state, and a second condition that both of the temperature detected by the temperature detecting unit for the right eye of the user and the temperature detected by the temperature detecting unit for the left eye of the user are below the predetermined temperature, the second condition making the head-mounted display device to change its operation state to the normal state, and when a switching condition is satisfied, the display control unit is configured to transition the image-light emission of the image-light generating units from the first state to the second state through the third state, when a first condition is selected, the display control unit is configured to transition the image-light emission of the image-light generating units from equally between the first state and the second state, and when a second condition is selected, the display control unit is configured to transition the image-light emission of the image-light generating units from one of the first state and the second state to the other of the first state and the second state.

10. The head-mounted display device according to claim 9, further comprising an image processing unit that receives a source image which becomes the virtual image and generates the image data for right eye of the user and the image data for left eye of the user based on the source image.

11. The head-mounted display device according to claim 9, wherein the image light emitted by the image-light generating unit that executes the emission of the image light in the power saving state is a same size as an image light emitted in a non-power saving state.

12. The head-mounted display device according to claim 9, wherein the virtual image made in the power saving state by one of the image-light generating unit for the right eye of the user and the image-light generating unit for the left eye of the user display in the virtual field of the user is the same as the virtual image displayed in the normal state.

13. The head-mounted display device according to claim 12, further comprising an image processing unit that receives a source image which becomes the virtual image and generates the image data for the right eye of the user and the image data for the left eye of the user based on the source image.

14. The head-mounted display device according to claim 12, wherein the image light emitted by image-light generating unit that executes the emission of the image light in the power saving state is a same size as an image light emitted in a non-power saving state.

15. A head-mounted display device for making a user recognize a virtual image in a state in which the head-mounted display device is mounted on a head of the user, the head-mounted display device comprising:

an image-light generating unit for the right eye of the user to generate an image light from image data for the right eye of the user and to emit the image light;

an image-light generating unit for the left eye of the user to generate the image light from image data for the left eye of the user and to emit the image light;

a display control unit configured to control an emission of each of the image light respectively generated by the image-light generating unit for the right eye of the user and the image-light generating unit for the left eye of the user;

a temperature detecting unit for the right eye of the user that detects a temperature of the image-light generating unit for the right eye of the user; and a temperature detecting unit for the left eye of the user that detects a temperature of the image-light generating unit for the left eye of the user, wherein the display control unit controls the head-mounted display device to change its operation state, according to a condition set in advance, between a power saving state and a normal state which makes both of the image-light generating unit for the right eye of the user and the image-light generating unit for the left eye of the user execute the emission of the image light, wherein in the power saving state, the display control unit transitions the image-light emission of the image-light generating units among a first state in which only the image-light generating unit for the left eye of the user emits image light, a second state in which only the image-light generating unit for the right eye of the user emits image light, and a third state in which both the image-light generating units for the left eye of the user and for the right eye of the user emit image light, the condition set in advance is a condition that the difference between the temperature detected by the temperature detecting unit for the right eye of the user and the temperature detected by the temperature detecting unit for the left eye of the user is equal to or larger than a predetermined temperature difference, and when a switching condition is satisfied, the display control unit is configured to transition the image-light emission of the image-light generating units from the first state to the second state through the third state, when a first condition is selected, the display control unit is configured to transition the image-light emission of the image-light generating units from equally between the first state and the second state, and when a second condition is selected, the display control unit is configured to transition the image-light emission of the image-light generating units from one of the first state and the second state to the other of the first state and the second state.

16. The head-mounted display device according to claim 15, wherein the virtual image made in the power saving state by one of the image-light generating unit for the right eye of the user and the image-light generating unit for the left eye of the user display in the virtual field of the user is the same as the virtual image displayed in the normal state.

* * * * *